United States Patent
Jin et al.

(10) Patent No.: US 12,201,947 B2
(45) Date of Patent: Jan. 21, 2025

(54) METHOD FOR PREPARING NANOFILTRATION MEMBRANE AND NANOFILTRATION MEMBRANE PREPARED THEREFROM

(71) Applicant: VONTRON TECHNOLOGY CO., LTD., Guizhou (CN)

(72) Inventors: Yan Jin, Guiyang (CN); Jiajia Zhang, Guiyang (CN)

(73) Assignee: Vontron Technology Co., Ltd., Guiyang (CN)

(*) Notice: Subject to any disclaimer, the term of this patent is extended or adjusted under 35 U.S.C. 154(b) by 407 days.

(21) Appl. No.: 17/634,675

(22) PCT Filed: Nov. 22, 2019

(86) PCT No.: PCT/CN2019/120224
§ 371 (c)(1),
(2) Date: Feb. 11, 2022

(87) PCT Pub. No.: WO2021/093001
PCT Pub. Date: May 20, 2021

(65) Prior Publication Data
US 2022/0331744 A1 Oct. 20, 2022

(30) Foreign Application Priority Data
Nov. 12, 2019 (CN) .......................... 201911100306.3

(51) Int. Cl.
*B01D 61/02* (2006.01)
*B01D 67/00* (2006.01)
(Continued)

(52) U.S. Cl.
CPC ....... *B01D 67/0006* (2013.01); *B01D 61/027* (2013.01); *B01D 67/0093* (2013.01);
(Continued)

(58) Field of Classification Search
CPC ............ B01D 67/0006; B01D 67/0093; B01D 61/027; B01D 71/60
See application file for complete search history.

(56) References Cited

U.S. PATENT DOCUMENTS

| 6,159,370 | A | 12/2000 | Hicke et al. |
| 9,943,811 | B2 | 4/2018 | Perry et al. |

(Continued)

FOREIGN PATENT DOCUMENTS

| CN | 1145918 A | 3/1997 |
| CN | 1404906 A | 3/2003 |

(Continued)

OTHER PUBLICATIONS

Hu et al—CN107899436A machine translation—Apr. 13, 2018 (Year: 2018).*

(Continued)

*Primary Examiner* — Bradley R Spies
(74) *Attorney, Agent, or Firm* — New River Valley IP Law, P.C.; Michele L. Mayberry; Ashley M. Gates

(57) ABSTRACT

A method for preparing a nanofiltration membrane and a nanofiltration membrane prepared therefrom, the method comprising the following steps: dissolving a polymer in a solvent to prepare a polymer solution, and curing the polymer solution on a support material to form a base membrane; sequentially applying a first liquid-phase solution and a second liquid-phase solution on the base membrane to form a nascent membrane; densifying the nascent membrane by using a solution that contains an alkaline substance; processing the densified nascent membrane by using a solution that contains an acidic substance; and obtaining the nanofiltration membrane after post-processing and drying.

21 Claims, 3 Drawing Sheets

(51) Int. Cl.
    *B01D 69/02*     (2006.01)
    *B01D 69/10*     (2006.01)
    *B01D 71/42*     (2006.01)
    *B01D 71/60*     (2006.01)
    *B01D 71/68*     (2006.01)
    *C02F 1/44*     (2023.01)
    *C02F 101/10*     (2006.01)
    *C02F 103/16*     (2006.01)

(52) U.S. Cl.
    CPC ......... *B01D 67/0095* (2013.01); *B01D 69/02* (2013.01); *B01D 69/105* (2013.01); *B01D 71/42* (2013.01); *B01D 71/60* (2013.01); *B01D 71/68* (2013.01); *C02F 1/442* (2013.01); *B01D 2323/08* (2013.01); *B01D 2323/12* (2013.01); *B01D 2323/22* (2013.01); *B01D 2323/36* (2013.01); *B01D 2325/30* (2013.01); *B01D 2325/34* (2013.01); *C02F 2101/101* (2013.01); *C02F 2103/16* (2013.01)

(56) References Cited

U.S. PATENT DOCUMENTS

| | | |
|---|---|---|
| 2007/0256969 A1 | 11/2007 | Ding et al. |
| 2011/0259817 A1 | 10/2011 | Mickols et al. |
| 2012/0273421 A1 | 11/2012 | Perry et al. |
| 2014/0299537 A1 | 10/2014 | Kim et al. |
| 2016/0207010 A1* | 7/2016 | Lapido .................. B01D 71/58 |
| 2017/0274377 A1 | 9/2017 | Yang et al. |

FOREIGN PATENT DOCUMENTS

| | | |
|---|---|---|
| CN | 101524626 A | 9/2009 |
| CN | 101874989 A | 11/2010 |
| CN | 102348492 A | 2/2012 |
| CN | 102949938 A | 3/2013 |
| CN | 103962019 A | 8/2014 |
| CN | 104941461 A | 9/2015 |
| CN | 105792916 A | 7/2016 |
| CN | 105934271 A | 9/2016 |
| CN | 106232213 A | 12/2016 |
| CN | 106731908 A | 5/2017 |
| CN | 107126851 A | 9/2017 |
| CN | 107899436 A | 4/2018 |
| CN | 108392992 A | 8/2018 |
| CN | 105435660 A | 9/2018 |
| CN | 109304099 A | 2/2019 |
| CN | 110394073 A | 11/2019 |
| CN | 111151137 A | 5/2020 |
| CN | 111659270 A | 9/2020 |
| CN | 112426894 A | 3/2021 |
| CN | 107743417 B | 8/2021 |
| JP | 2002502692 A | 1/2002 |
| JP | 2006043655 A | 2/2006 |
| JP | 2018103097 A | 7/2018 |
| WO | 9940996 A1 | 8/1999 |
| WO | 2010082194 A2 | 7/2010 |
| WO | 2014168584 A1 | 10/2014 |
| WO | 2015044941 A1 | 4/2015 |
| WO | 2022127637 A1 | 6/2022 |
| WO | 2023087481 A1 | 5/2023 |

OTHER PUBLICATIONS

International Application No. PCT/CN2019/120224, International Search Report and Written Opinion (8 pages) with English translation of the the International Search Report (2 pages).
Liu Chao-feng and Fang Shao-ming, "Progress in preparation techniques of nanofiltration membrane at home and abroad", Technology of Water Treatment, vol. 33, No. 6, Jun. 2007, 5 pages (including English Abstract).
(Hu, Lijie et al.) Co-pending International Application No. PCT/CN2019/120224, filed Nov. 22, 2019.
(Liang, Songmiao et al.) Co-pending U.S. Appl. No. 18/257,230, filed Jun. 13, 2023.
(Liang, Songmiao et al.) Co-pending U.S. Appl. No. 18/257,789, filed Jun. 15, 2023.
(Liang, Songmiao et al.) Co-Pending International Application No. PCT/CN2021/135779, filed Dec. 6, 2021.
(Liang, Songmiao et al.) Co-pending International Application No. PCT/CN2021/140077, filed Dec. 21, 2023.
Co-pending U.S. Appl. No. 18/257,230, Preliminary Amendment dated Jun. 14, 2023, 6 pages.
Co-pending U.S. Appl. No. 18/257,789, Preliminary amendment dated Sep. 13, 2023, 10 pages.
Co-Pending International Application No. PCT/CN2021/135779, English Translation of Mar. 1, 2022 Written Opinion, 5 pages.
Co-Pending International Application No. PCT/CN2021/135779, International Search Report dated Mar. 1, 2022, 5 pages.
Co-pending International Application No. PCT/CN2021/140077, International Search Report dated Aug. 16, 2022 (10 pages) and English translation (2 pages).
Wu, M. et al. "Ultrathin nanofiltration membrane with polydopamine-covalent organic framework interlayer for enhanced permeability and structural stability", Journal of Membrane Science 576 (2019) 131-141.
Hu, R. et al. "Graphene oxide-in-polymer nanofiltration membranes with enhanced permeability by interfacial polymerization", Journal of Membrane Science 564 (2018) 813-819, Abstract Only.

\* cited by examiner

Immersion time in 10% HF solution (day)

METHOD FOR PREPARING NANOFILTRATION MEMBRANE AND NANOFILTRATION MEMBRANE PREPARED THEREFROM

TECHNICAL FIELD

The present disclosure relates to the technical field of membranes for water treatment, more specifically to the technical field of nanofiltration membranes, and in particular to a method capable of realizing the continuous production of an acid-resistant nanofiltration membrane with a high desalting rate and a high flux, and a nanofiltration membrane prepared therefrom.

BACKGROUND

Conventional nanofiltration membrane materials are polyamide nanofiltration membranes. In strong acidic environment, the electron withdrawing effect of the carbonyl group present in the polyamide bond causes the electron cloud to be concentrated towards the carbonyl oxygen, so the hydrogen atom bonded to nitrogen atom in the amide bond is in an electron-deficient state, and a nucleophilic substitution reaction occurs. As a result, the molecular rearrangement occurs, resulting in the breakage of the amide bond. Consequently, the functional layer becomes defective, which affects the performance of membrane.

Acid-resistant nanofiltration membranes refer typically to nanofiltration membranes capable of withstanding inorganic acids and organic acids at a concentration of 20%, such as hydrochloric acid, sulfuric acid, and phosphoric acid, and strong oxidizing acids such as nitric acid, and strong corrosive acids such as hydrofluoric acid. They are mainly used in industries faced with more complex and extreme feed environment. For example, they are used for wastewater treatment in chemical, electroplating, medicine, dairy, food and beverage, coating industries, etc.; for treatment of wastewater resulting from the smelting of mineral products such as copper, aluminum, gold, zinc, nickel, uranium, and rare earth; for purification of acidic solutions and removal of metal cations; for concentration and recovery of organic chemical substances in acidic solutions, and concentration and recovery of ions; and for recovery of corrosive cleaning solutions containing strong acids.

At present, acid-resistant nanofiltration membranes are mainly prepared from amine monomers and heterocyclic acyl chloride monomers. However, most of the acid-resistant nanofiltration membranes are currently produced intermittently, which extends the production cycle of the membranes and increases the production costs, and is also unfavorable for creating environmentally friendly and hygienic preparation conditions and scale production. Moreover, there are few relevant patents. Patent Literature 1 (U.S. Pat. No. 9,943,811B2) provides a method for preparing an acid-resistant nanofiltration membrane for removing metal ions from mining wastewater. Its supporting base membrane is covalently bonded to the non-woven support material. The acid-resistant nanofiltration membrane prepared by reacting a polyfunctional amine monomer with a diazine monomer and then immersing the resultant in a sulfuric acid solution at a certain concentration and a certain temperature for a certain period of time is used to treat a 20% $H_2SO_4$ solution containing 8.5% $CuSO_4$, and removes more than 70% of copper sulfate at a flux greater than 1 gfd. The membranes prepared by this method have good acid resistance, but they are produced intermittently, thereby resulting in a long production cycle, which is not conducive to the industrial scale production and preparation of acid-resistant nanofiltration membranes. Moreover, both the desalting rate and flux of the resulting acid-resistant nanofiltration membranes are not so high.

Therefore, the continuous production and performance improvement of acid-resistant nanofiltration membranes are two major technical problems to be solved at present. It is of great and practical significance and value to develop the scale preparation technique of acid-resistant nanofiltration membranes, increase the water production and desalting rate of acid-resistant nanofiltration membranes, reduce the production costs of acid-resistant nanofiltration membranes, and realize safe, hygienic and environmentally friendly preparation of acid-resistant nanofiltration membranes.

SUMMARY

Technical Problems

To address the technical problems of intermittent preparation, discontinuous production, long production cycle, high production costs, and relatively poor performance of the prepared acid-resistant nanofiltration membranes existing in the current scale production of acid-resistant nanofiltration membranes, the present disclosure provides a preparation method capable of realizing the continuous production of an acid-resistant nanofiltration membrane with high performance (a high desalting rate and a high flux), and a nanofiltration membrane prepared therefrom.

Through processes such as preparation of base membranes, generation of nascent membranes, densification of the skin layer, and flux improvement, the preparation method of acid-resistant nanofiltration membranes provided in the present disclosure achieves continuous scale production of the membranes. Consequently, the production cycle of the membranes is shortened and effectively controllable on the one hand, and the continuous production can greatly reduce the production costs of the membranes on the other hand. In addition, the performance of the acid-resistant nanofiltration membranes prepared by the production process provided in the present disclosure is remarkably improved in comparison to those reported in the previous patent literatures.

Solution to Problems

In order to fulfill the above-mentioned objects, the inventors of the present disclosure have conducted intensive researches and proposed a method for preparing an acid-resistant nanofiltration membrane. This is a method of continuous production, that is, the method is able to be completed in a single production line, which is capable of reducing the production cost of the membranes, rendering the production process of the membranes more stable, and allowing the performance of the membranes easier to be uniform, thereby realizing low-cost and stable scale production. The specific steps of the method comprise preparation of base membrane, generation of nascent membrane, densification of the skin layer, flux improvement, and so forth.

The method provided in the present disclosure comprises: firstly, selecting a polymeric material for the supporting base membrane, and selecting materials for the first liquid-phase component and the second liquid-phase component so as to enable the prepared membrane material to have excellent acid resistance; further, processing the nascent membrane by using an alkaline substance-containing solution, so as to promote the densification and completeness of the structure of the nascent membrane, thereby significantly increasing the desalting rate of the membrane; furthermore, processing the densified nascent membrane by using an acidic chemical substance-containing solution, so as to enable the groups inside the membrane that are not involved in the densification reaction to be protonated or activated, thereby significantly increasing the flux of the membrane while maintaining a high desalting rate.

One aspect of the present disclosure relates to a method for preparing a nanofiltration membrane, comprising the steps of:
  dissolving a polymer in a solvent to prepare a polymer solution, and curing the polymer solution on a support material to form a base membrane;
  sequentially applying a first liquid-phase solution and a second liquid-phase solution on the base membrane to form a nascent membrane;
  densifying the nascent membrane by using an alkaline substance-containing solution;
  processing the densified nascent membrane by using an acidic substance-containing solution; and
  obtaining the nanofiltration membrane after post-processing and drying.

In the method for preparing a nanofiltration membrane according to the present disclosure, the polymer is at least one selected from the group consisting of polysulfone, polyethersulfone, polyvinylidene fluoride, polytetrafluoroethylene, polyether-ether-ketone, phthalazinone polyether nitrile ketone, and phthalazinone polyether ketone; preferably, in the polymer solution, a content of the polymer is 0.05 kg/L to 0.35 kg/L, preferably 0.1 kg/L to 0.3 kg/L, and more preferably 0.15 kg/L to 0.25 kg/L, relative to the content of the solvent; the polymer solution optionally contains a non-solvent, and preferably, the non-solvent is at least one selected from the group consisting of an alcohol having 1 to 6 carbon atoms, polyethylene glycol, polyvinylpyrrolidone, polypropylene glycol, and polybutylene glycol; and preferably, the support material is a non-woven fabric.

In the method for preparing a nanofiltration membrane according to the present disclosure, the first liquid-phase solution contains a polyfunctional amine substance, and preferably, the polyfunctional amine substance is at least one selected from the group consisting of an aromatic diamine monomer having 6 to 12 carbon atoms, polyethyleneimine, polyvinylaniline, and polybenzylamine; preferably, a content of the polyfunctional amine substance is 2 to 8 wt %, preferably 3 to 7 wt %, and more preferably 4 to 6 wt %, based on the weight of the first liquid-phase solution; preferably, a number-average molecular weight of polyethyleneimine, polyvinylaniline and polybenzylamine is in the range of 400 to 10,000 Da; the first liquid-phase solution optionally contains a surfactant, and preferably, the surfactant is at least one selected from the group consisting of stearic acid, sodium lauryl sulfonate, alkyl glucoside $C_{16}H_{32}O_6$, sulfated castor oil, dioctyl sodium sulfosuccinate, and a polyoxyethylene-polyoxypropylene copolymer; and preferably, the solvent in the first liquid-phase solution is water.

In the method for preparing a nanofiltration membrane according to the present disclosure, the second liquid-phase solution contains a monomer or a polymer of a di-substituted, tri-substituted or tetra-substituted diazine or triazine, or a derivative of a triazine monomer, preferably a monomer or an oligomer of a di-substituted, tri-substituted or tetra-substituted diazine or triazine, or a derivative of a triazine monomer, more preferably a di-substituted, tri-substituted or tetra-substituted s-triazine or a monomer or an oligomer of 1,2,4-triazine, or a derivatives of a triazine monomer; preferably, a content of the monomer or the polymer of the di-substituted, tri-substituted or tetra-substituted diazine or triazine, or the derivative of the triazine monomer is 0.1 to 0.7 wt %, preferably 0.2 to 0.6 wt %, and more preferably 0.3 to 0.5 wt %, based on the weight of the second liquid-phase solution; preferably, the solvent in the second liquid-phase solution is at least one selected from the group consisting of a linear or branched alkane having 1 to 8 carbon atoms and a cycloalkane having 5 to 10 carbon atoms.

In the method for preparing a nanofiltration membrane according to the present disclosure, the alkaline substance is at least one selected from the group consisting of a weak alkaline chemical substance and a salt formed by a strong alkali and a weak acid, preferably at least one selected from the group consisting of carbonate, bicarbonate, bisulfite, acetate, phosphate and hypochlorite of sodium, potassium, calcium and barium.

In the method for preparing a nanofiltration membrane according to the present disclosure, a content of the alkaline substance is 3 to 25 wt %, and preferably 3 to 20 wt %, based on the weight of the alkaline substance-containing solution; preferably, the solvent in the alkaline substance-containing solution is water.

In the method for preparing a nanofiltration membrane according to the present disclosure, the acidic substance is at least one selected from the group consisting of a moderately acidic chemical substance, a weakly acidic chemical substance, and a salt formed by a strong acid and a weak base, preferably at least one selected from the group consisting of phosphoric acid, formic acid, acetic acid, propionic acid, lactic acid, malic acid, citric acid, copper sulfate, iron sulfate, ferric chloride, ammonium chloride, and aluminum chloride; preferably, a content of the acidic chemical substance is 5 to 25 wt %, preferably 5 to 20 wt %, and more preferably 5 to 15 wt %, based on the weight of the acidic chemical substance-containing solution; and preferably, the solvent in the acidic substance-containing solution is water.

In the method for preparing a nanofiltration membrane according to the present disclosure, said densifying is carried out when the alkaline substance-containing solution is in a temperature range of from 30 to 80° C.

In the method for preparing a nanofiltration membrane according to the present disclosure, said processing of the densified nascent membrane is carried out when the acidic chemical substance-containing solution is in a temperature range of from 25 to 50° C.

Another aspect of the present disclosure relates to a nanofiltration membrane prepared by the method for preparing a nanofiltration membrane according to the present disclosure.

Effects of the Present Disclosure

By the preparation method of nanofiltration membranes provided by the present disclosure, it is possible to realize the continuous production of acid-resistant nanofiltration membranes with a high desalting rate and a high flux at low costs, and realize safe, hygienic and environmentally friendly preparation of acid-resistant nanofiltration membranes. The nanofiltration membranes prepared by the preparation method of nanofiltration membranes provided by the present disclosure have excellent acid resistance, remove more than 96% of metal salts such as $FeSO_4$, $CuSO_4$, $MgSO_4$, $Al_2(SO_4)_3$, $NiSO_4·6(H_2O)$, $CoSO_4·7H_2O$ or the like from a mixture containing 2,000 ppm of the metal salts mentioned above, allow more than 90% of acids such as 20% HCl, $HNO_3$, $H_2SO_4$, $H_3PO_4$ or the like to permeate, and have a membrane flux of 10 to 20 gfd. In this way, it is possible to realize the removal of metal ions in the treatment of wastewater resulting from the smelting of mineral products such as copper, aluminum, gold, zinc, nickel, uranium, and rare earth, and it is possible to realize the purification of acidic solutions and the treatment of wastewater in chemical, electroplating, medicine, dairy, food and beverage, coating industries, etc by removing metal cations.

DETAILED DESCRIPTION

Figure 1:
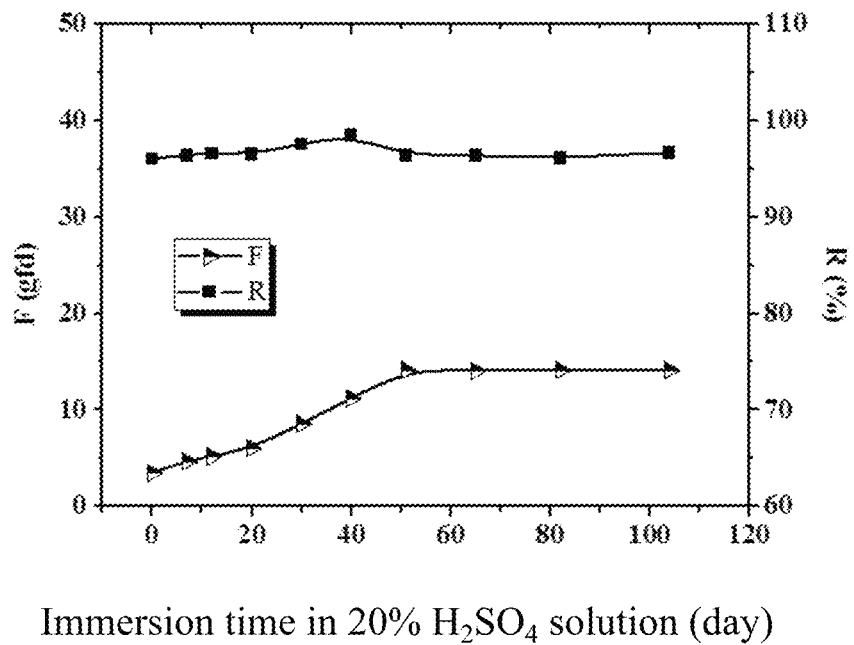
FIG. 1 shows the test results of the removal rate of 2000 ppm $MgSO_4$ and the membrane flux after immersing the acid-resistant nanofiltration membrane obtained according to Example 1 in 20% $H_2SO_4$ solution for different periods of time.

The term "optional" or "optionally" means that the event or circumstance described later may or may not occur. This description includes occurrence of the event or circumstance and non-occurrence of the event or circumstance. For example, "optionally" containing means that something may or may not be contained. The amino group of the aromatic diamine having 6 to 12 carbon atoms being "optionally" substituted with a phenyl group means that the amino group may be unsubstituted, monosubstituted, polysubstituted, or fully substituted. It is understandable to a person skilled in the art that any group containing one or more substituents will not be introduced with any spatially impossible and/or unsynthesizable substitution or substitution pattern.

Reference throughout the present specification to "one embodiment", or "an embodiment", or "in another embodiment", or "in some embodiments", or "in some embodiments of the present disclosure" means that a specific referent element, structure, or feature described in connection with the embodiment is included in at least one embodiment. Therefore, the phrase "in one embodiment", or "in an embodiment", or "in another embodiment", or "in some embodiments", or "in some embodiments of the present disclosure" present in different parts throughout the specification does not necessarily all refer to the same embodiment. Moreover, the specific element, structure, or feature may be combined in any suitable manner in one or more embodiments.

Unless otherwise specified in the present disclosure, throughout the specification and claims which follow, the terms "comprise", "contain", and variations thereof, such as "comprises", "comprising", "contains", and "containing" should be construed as an open and inclusive meaning, that is, "comprising but not limited to", or "containing but not limited to".

It should be understood that as used in the specification and the appended claims of the present disclosure, the singular-form articles "a", "an" and "the" include plural referents, unless the context clearly dictates otherwise. It should also be understood that the term "or" is typically used to include the meaning of "and/or", unless the context clearly dictates otherwise.

In one embodiment, the present disclosure provides a method for preparing a nanofiltration membrane, comprising the steps of:
dissolving a polymer in a solvent to prepare a polymer solution, and curing the polymer solution on a support material to form a base membrane (hereinafter referred to as "base membrane preparation step");
sequentially applying a first liquid-phase solution and a second liquid-phase solution on the base membrane to form a nascent membrane (hereinafter referred to as "nascent membrane preparation step");
densifying the nascent membrane by using an alkaline substance-containing solution (hereinafter referred to as "densification step");
processing the densified nascent membrane by using an acidic substance-containing solution (hereinafter referred to as "flux improvement step"); and
obtaining the nanofiltration membrane after post-processing and drying.

In the base membrane preparation step, the polymer is at least one selected from the group consisting of polysulfone, polyethersulfone, polyvinylidene fluoride, polytetrafluoroethylene, polyether-ether-ketone, phthalazinone polyether nitrile ketone, and phthalazinone polyether ketone. The molecular weight of the polymer is not particularly limited. Preferably, the number-average molecular weight is between 10,000 and 100,000 Da.

The solvent in the polymer solution is not particularly limited as long as it is capable of adequately dissolving polymers. Preferably, the solvent is at least one selected from the group consisting of N,N-dimethylformamide, N,N-dimethylacetamide, dimethyl sulfoxide, N-methylpyrrolidone, tetrahydrofuran, and imidazolinone.

The support material is not particularly limited. Preferably, the support material is a non-woven fabric.

In some embodiments, preferably, in the polymer solution, the content of the polymer is 0.05 kg/L to 0.35 kg/L, preferably 0.1 kg/L to 0.3 kg/L, and more preferably 0.15 kg/L to 0.25 kg/L, relative to the content of the solvent. If the content of the polymer is less than 0.05 kg/L, the pressure resistance of the nanofiltration membrane may be somewhat reduced. If the content of the polymer is greater than 0.35 kg/L, the viscosity of the membrane casting solution will increase, which will increase the difficulty in the preparation of base membranes and the deficiencies thereof.

In some embodiments, the polymer solution optionally contains a non-solvent, and preferably, the non-solvent is at least one selected from the group consisting of an alcohol having 1 to 6 carbon atoms, polyethylene glycol, polyvinylpyrrolidone, polypropylene glycol, and polybutylene glycol. As an alcohol having 1 to 6 carbon atoms, at least one selected from the group consisting of methanol, ethanol, n-propanol, isopropanol, n-butanol, isobutanol, tert-butanol, n-pentanol, isopentanol, hexanol, and the like may be exemplified. The non-solvent is preferably at least one selected from the group consisting of ethanol, n-propanol, isopropanol, n-butanol, polyethylene glycol, polypropylene glycol, and polybutylene glycol. Preferably, the content of the non-solvent is 0.02 kg/L to 0.03 kg/L, relative to the content of the solvent.

The solvent and non-solvent may be appropriately selected according to the compositional stability and phase separation state of the membrane casting solution. The base membrane prepared has a molecular weight cutoff of between 10,000 and 70,000 Da.

In the present disclosure, the method for forming a base membrane by curing is not particularly limited. It is preferred that the base membrane is formed by the liquid-solid phase inversion method. Preferably, the occurrence time of phase inversion is controlled between 5 s and 1 min; the temperature of the water bath is 15 to 25° C.; the temperature of the water bath for thermosetting is 70 to 85° C.; and the thickness of the membrane including the non-woven fabric is 5.8 to 6.5 mil.

As a non-limiting example, the base membrane preparation step comprises:
adding 0.05 kg/L to 0.35 kg/L of polymer, and 0.02 kg/L to 0.03 kg/L of non-solvent to a solvent, and stirring at room temperature for 12 h till the polymer is fully dissolved; filtering the mixture and leaving it to defoam for 12 h; forming the polymer solution into a base membrane on a non-woven fabric by the liquid-solid phase inversion method, wherein the occurrence time of phase inversion is controlled between 5 s and 1 min; the temperature of the water bath is 15 to 25° C.; the temperature of the water bath for thermosetting is 70 to 85° C.; and the thickness of the membrane including the non-woven fabric is 5.8 to 6.5 mil.

In the nascent membrane preparation step, it is preferred that a first liquid-phase solution and a second liquid-phase solution are sequentially applied on the base membrane obtained above by way of coating, so that they are brought into contact and react with each other to form a nascent membrane.

The first liquid-phase solution contains a polyfunctional amine substance, and preferably, the polyfunctional amine substance is at least one selected from the group consisting of an aromatic diamine monomer having 6 to 12 carbon atoms, polyethyleneimine, polyvinylaniline, and polybenzylamine.

As an aromatic diamine having 6 to 12 carbon atoms, at least one selected from the group consisting of p-phenylenediamine, m-phenylenediamine, o-phenylenediamine, p-toluene diamine, m-toluene diamine, o-toluene diamine, biphenyl diamine, and the like may be exemplified. Preferably, the amino group of the aromatic diamine having 6 to 12 carbon atoms is optionally substituted with a phenyl group. More preferably, the aromatic diamine monomer having 6 to 12 carbon atoms is at least one selected from the group consisting of N-phenyl-p-phenylenediamine, N-phenyl-m-phenylenediamine, N,N-diphenyl-p-phenylenediamine, and N,N-diphenyl-m-phenylenediamine.

In some embodiments, preferably, the content of the polyfunctional amine substance is 2 to 8 wt %, preferably 3 to 7 wt %, and more preferably 4 to 6 wt %, based on the weight of the first liquid-phase solution. When the content is less than 2 wt %, the surface of the nascent membrane is defective. When the content is greater than 8 wt %, the flux of the final membrane is extremely low.

In some embodiments, preferably, the number-average molecular weight of polyethyleneimine, polyvinylaniline and polybenzylamine is in the range of 400 to 10,000 Da.

In some embodiments, the first liquid-phase solution optionally contains a surfactant, and preferably, the surfactant is at least one selected from the group consisting of stearic acid, sodium lauryl sulfonate, alkyl glucoside $C_{16}H_{32}O_6$, sulfated castor oil, dioctyl sodium sulfosuccinate, and a polyoxyethylene-polyoxypropylene copolymer. The function of the surfactant is to help building a chemical interaction between the first liquid-phase solution and the supporting base membrane to enhance the binding force therebetween. Preferably, the content of the surfactant is 0.1 to 0.3 wt % based on the weight of the first liquid-phase solution.

The solvent in the first liquid-phase solution is not particularly limited, and is preferably water.

In some embodiments, the second liquid-phase solution contains monomers or polymers of di-substituted, tri-substituted or tetra-substituted diazine or triazine, or derivatives of triazine monomers. The monomers or polymers of di-substituted, tri-substituted or tetra-substituted diazine or triazine, or derivatives of triazine monomers are preferably monomers or oligomers of di-substituted, tri-substituted or tetra-substituted diazine or triazine, or derivatives of triazine monomers, more preferably di-substituted, tri-substituted or tetra-substituted s-triazines or 1,2,4-triazine monomers or oligomers, or derivatives of triazine monomers. Preferably, the substituent is at least one selected from the group consisting of a halogen atom, an amino group, a carbonyl group, a mercapto group, a methyl mercapto group, an alkyl group having 6 to 12 carbon atoms, an alkylamino group having 1 to 4 carbon atoms, a di(alkylol)amino group having 2 to 8 carbon atoms, and the like. As a halogen atom, at least one selected from the group consisting of a fluorine atom, a chlorine atom, a bromine atom, an iodine atom, and the like may be exemplified. As an alkyl group having 1 to 6 carbon atoms, at least one selected from the group consisting of methyl, ethyl, n-propyl, isopropyl, n-butyl, isobutyl, tert-butyl, n-pentyl, isopentyl, n-hexyl, isohexyl, and the like may be exemplified. As an alkylamino group having 1 to 4 carbon atoms, at least one selected from the group consisting of methylamino, ethylamino, propylamino, isopropylamino, n-butylamino, isobutylamino, tert-butylamino, and the like may be exemplified. As a di(alkylol)amino group having 2 to 8 carbon atoms, at least one selected from the group consisting of di(methanol)amino group, di(ethanol)amino group, di(propanol)amino group, di(butanol)amino group, and the like may be exemplified.

Examples of the monomers or polymers of di-substituted, tri-substituted or tetra-substituted diazine or triazine or derivatives of triazine monomers include, but are not limited to, at least one selected from the group consisting of cyanuric chloride, metribuzin, 2-chloro-4-ethylamino-6-isopropylamino-1,3,5-triazine, 2,4-dichloro-1,3,5-s-triazine, sodium salt of 4,4'-bis(2-chloro-4-diethanolamine-1,3,5-triazine)-6'-amino-2,2'-disulfobiphenyl, a triazine ring-containing azacyclophane compound, a triazine ring-containing heterocyclic compound with sprout ring(s) or fused ring(s), an s-triazine-containing porous aromatic framework material, or the like.

In some embodiments, preferably, the content of the monomers or polymers of di-substituted, tri-substituted or tetra-substituted diazine or triazine or derivatives of triazine monomers is 0.1 to 0.7 wt %, preferably 0.2 to 0.6 wt %, and more preferably 0.3 to 0.5 wt %, based on the weight of the second liquid-phase solution. When the content is less than 0.1 wt %, the surface of the nascent membrane is defective. When the content is greater than 0.7 wt %, the flux of the final membrane is extremely low.

In some embodiments, preferably, the solvent in the second liquid-phase solution is at least one selected from the group consisting of a linear or branched alkane having 1 to 8 carbon atoms and a cycloalkane having 5 to 10 carbon atoms. As a linear or branched alkane having 1 to 8 carbon atoms, at least one selected from the group consisting of methane, ethane, n-propane, isopropane, n-butane, isobutane, n-pentane, isopentane, n-hexane, isohexane, n-heptane, n-octane, and the like may be exemplified. As a cycloalkane having 5 to 10 carbon atoms, at least one selected from the group consisting of cyclopentane, cyclohexane, ethylcyclohexane, cycloheptane, cyclooctane, cyclononane, cyclodecane, and the like may be exemplified. As the solvent in the second liquid-phase solution, at least one selected from the group consisting of n-pentane, n-hexane, n-heptane, n-octane, ethylcyclohexane, and the like may be exemplified.

As a non-limiting example, the nascent membrane preparation step comprises:
  coating a first liquid-phase solution on the base membrane by a coating device, wherein the first liquid-phase solution contains 4 to 6 wt % of a polyfunctional amine substance and 0.1 to 0.3 wt % of a surfactant, and the coating device allows the first liquid-phase solution to move at a speed of 1 to 6 m/min relative to the base membrane, so that the first liquid-phase solution is in sufficient contact with the supporting base membrane;
  coating a second liquid-phase solution on the base membrane that has been coated with the first liquid-phase solution, wherein the second liquid-phase solution contains 0.3 to 0.5 wt % cyanuric chloride or metribuzin; the coating device allows the second liquid-phase solution to move at a speed of 1 to 6 m/min relative to the base membrane that has been coated with the first liquid-phase solution, so as to achieve sufficient contact; and within 3 to 5 min at 20 to 30° C., the first liquid-phase solution and the second liquid-phase solution are capable of contacting and reacting with each other to form a nascent membrane.

In the densification step, the alkaline substance is at least one selected from the group consisting of a weak alkaline chemical substance and a salt formed by a strong alkali and a weak acid, preferably at least one selected from the group consisting of carbonate, bicarbonate, bisulfite, acetate, phosphate and hypochlorite of sodium, potassium, calcium and barium, more preferably, at least one selected from the group consisting of carbonate, bicarbonate, bisulfite, acetate, phosphate and hypochlorite of sodium and potassium, and still more preferably, at least one selected from the group consisting of sodium carbonate, sodium bicarbonate, potassium bicarbonate, sodium bisulfite, sodium acetate, potassium acetate, sodium phosphate, potassium phosphate and sodium hypochlorite.

The content of the alkaline substance is 3 to 25 wt %, preferably 3 to 20 wt %, and more preferably 10 to 20 wt %, based on the weight of the alkaline substance-containing solution. When the content is less than 3 wt %, the final acid-resistant nanofiltration membrane is defective with an extremely low removal rate. When the content is greater than 25 wt %, the manufacturing costs of the equipment for continuous production of the nanofiltration membranes are increased, which is unfavorable for continuous production.

The solvent in the alkaline substance-containing solution is not particularly limited, and is preferably water.

In some embodiments, said densifying is carried out when the alkaline substance-containing solution is in a temperature range of from 30 to 80° C., preferably in a temperature range of from 50 to 80° C., and more preferable in a temperature range of from 70 to 80° C. When the temperature is lower than 30° C., the removal rate of the final acid-resistant nanofiltration membrane is extremely low. When the temperature is higher than 80° C., the manufacturing costs of the equipment for continuous production of the acid-resistant nanofiltration membranes are increased.

Since the functional groups in the first liquid-phase solution and the second liquid-phase solution react step by step at different temperatures, treating the nascent membrane generated above in an alkaline substance-containing solution is capable of further catalyzing the reaction of the functional groups in the first liquid-phase solution and the second liquid-phase solution, so that the functional groups react with one another sufficiently, thereby achieving the densification and completeness of the membrane structure. The desalting rate of the densified membrane is significantly increased to 96% or more, and the flux reaches 3 to 5 gfd.

As a non-limiting example, the densification step comprises:
  passing the nascent membrane formed above at a speed of 3 m/min through a production line box containing a potassium acetate or sodium bicarbonate solution having a concentration of 10 to 20 wt % at a temperature of 70 to 80° C., so that the functional groups in the first liquid-phase solution and the second liquid-phase solution react with one another sufficiently.

In the flux improvement step, the acidic substance is at least one selected from the group consisting of a moderately acidic chemical substance, a weakly acidic chemical substance, and a salt formed by a strong acid and a weak base, preferably at least one selected from the group consisting of phosphoric acid, formic acid, acetic acid, propionic acid, lactic acid, malic acid, citric acid, copper sulfate, iron sulfate, ferric chloride, ammonium chloride and aluminum chloride, and more preferably at least one selected from the group consisting of copper sulfate, iron sulfate, acetic acid, propionic acid, citric acid, malic acid and lactic acid.

The content of the acidic substance is 5 to 25 wt %, preferably 5 to 20 wt %, and more preferably 5 to 15 wt %, based on the weight of the acidic substance-containing solution. When the content is less than 5 wt %, there is no obvious improvement in the flux of the acid-resistant nanofiltration membrane. When the content is greater than 25 wt %, the manufacturing costs of the equipment for continuous production of the acid-resistant nanofiltration membranes are increased.

The solvent in the acidic substance-containing solution is not particularly limited, and is preferably water.

In some embodiments, preferably, the flux improvement step is carried out when the acidic substance-containing solution is in a temperature range of 25 to 50° C., more preferably in a temperature range of 30 to 40° C. When the temperature is lower than 25° C., there is no obvious improvement in the flux of the acid-resistant nanofiltration membrane. When the temperature is higher than 50° C., not only the surface structure of the acid-resistant nanofiltration membrane is destroyed, but the manufacturing costs of the equipment for continuous production of the acid-resistant nanofiltration membranes are increased.

After the densification described above, the desalting rate of the membrane is significantly improved, and the flux is also greater than that of the acid-resistant nanofiltration membrane in the prior art. In order to further improve the flux, the treatment aiming at flux improvement is carried out. An activation solution is introduced after allowing the membrane to pass through the production line box capable of catalyzing the reaction in the densification step. The membrane is activated, so that the groups inside the membrane that do not participate in the densification reaction are protonized or activated, thereby effectively improving the flux. The flux of the activated acid-resistant nanofiltration membrane is greatly increased to 10 to 20 gfd, and the desalting rate is greater than 96%. At least one acidic substance contained in this activated solution allows the groups inside the membrane that do not participate in the densification reaction to be protonized or activated.

As a non-limiting example, the flux improvement step comprises:

passing the densified membrane at a speed of 3 m/min through an acetic acid or lactic acid solution having a concentration of 10 to 15 wt % at a temperature of 30 to 40° C., so that the groups inside the membrane that do not participate in the densification reaction are protonized or activated.

In another embodiment, the present disclosure further relates to a nanofiltration membrane prepared by the method for preparing the nanofiltration membrane according to the present disclosure, which has excellent acid resistance, remove more than 96% of metal salts such as $FeSO_4$, $CuSO_4$, $MgSO_4$, $Al_2(SO_4)_3$, $NiSO_4 \cdot 6(H_2O)$ or $CoSO_4 \cdot 7H_2O$ from a mixture containing 2,000 ppm of the metal salts mentioned above, allow more than 90% of acids such as 20% HCl, $HNO_3$, $H_2SO_4$ or $H_3PO_4$ to permeate, and has a membrane flux of 10 to 20 gfd. In this way, it is possible to realize the removal of metal ions in the treatment of wastewater resulting from the smelting of mineral products such as copper, aluminum, gold, zinc, nickel, uranium, and rare earth, and it is possible to realize the purification of acidic solutions and the treatment of wastewater in chemical, electroplating, medicine, dairy, food and beverage, coating industries, etc by removing metal cations.

EXAMPLES

The present disclosure will be further described in detail below by way of specific examples. However, the present disclosure is not limited to the examples presented below. It should be noted that the reagents and raw materials used in the examples of the present disclosure are all conventional products that are commercially available, unless otherwise specified. The content described in the examples is weight content unless otherwise specified.

$MgSO_4$ Removal Test and Water Flux Test

The nanofiltration membranes prepared in the examples were taken and placed on a membrane detecting worktable for conventional desalination test. Under the test conditions of the operating pressure being 100 psi, the conductivity being 4000 μs/m, the concentration of an original $MgSO_4$ aqueous solution being 2000 ppm, the temperature of the solution being 25° C., and the pH being 6.5 to 7.5, the water fluxes and desalting rates of the membranes after running for 30 min were measured.

SEM Observation

The surface morphological information of the nanofiltration membranes was detected with a Japanese Hitachi S-4800 field emission scanning electron microscope. Firstly, after the membranes were fractured in liquid nitrogen, the sample membranes were fixed on a sample stage with a conductive adhesive. Thereafter, the samples were put in a high-vacuum evaporator, and sprayed and plated with gold. After a certain period of time, a uniform layer plated with gold was formed on the surface of the sample membranes. The sample membranes were taken out, placed in the chamber of the scanning electron microscope. The chamber was evacuated, the acceleration voltage was 1.0 kV, and the magnification was 50,000 and 100,000.

Example 1

(1) Preparation of Base Membrane 200 kg of phthalazinone polyether nitrile ketone (number-average molecular weight: 23,000 Da) and 20 kg of n-butanol were added to 1000 L N-methylpyrrolidone solvent, and stirred at a constant temperature of 25° C. for 12 h to dissolve them completely. Thereafter, the mixture was filtered, and left to defoam at 25° C. for 12 h, thereby giving a homogeneous and stable membrane casting solution for subsequent use.

The resulting membrane casting solution was uniformly coated on a non-woven substrate by a flat-plate film coating machine, and then put in a water circulating cooling tank where it passed successively through a room-temperature water tank and a 75° C. water tank to ensure complete exchange of solvent in the membrane. During the membrane coating, the ambient temperature was 25° C., and the ambient humidity was 40%; the residence time in air for evaporation was 5 s; the membrane coating rate was 8 m/min; the thickness of the membrane including the non-woven substrate was 6.5 mil. The performance evaluation showed that the molecular weight cutoff of the resulting base membrane was 20,000 Da.

(2) Generation of Nascent Membrane

The supporting base membrane made of phthalazinone polyether nitrile ketone prepared in step (1) was coated by a coating device with a first liquid-phase solution, which was an aqueous solution comprising 6% polyethyleneimine (number-average molecular weight: 6,000 Da) and 0.2% alkyl glucoside $C_{16}H_{32}O_6$. The coating device allowed the first liquid-phase solution to move at a speed of 2 m/min relative to the supporting base membrane made of phthalazinone polyether nitrile ketone, so that the polyethyleneimine solution was in sufficient contact with the supporting base membrane. A second liquid-phase solution was coated onto the supporting base membrane that had been coated with the polyethyleneimine solution. The second liquid-phase solution was an n-octane solution containing 0.5% cyanuric chloride. The coating device allowed the cyanuric chloride solution to move at a speed of 1 m/min relative to the supporting base membrane that had been coated with the polyethyleneimine solution, so as to realize sufficient contact. After reacting at 25° C. for 3 min, polyethyleneimine and cyanuric chloride could contact and react with each other, thereby producing a nascent membrane. The performance evaluation showed that this nascent membrane had a removal rate of 48% for 2,000 ppm $MgSO_4$ with a flux of 5 gfd.

(3) Densification of the Skin Layer

The nascent membrane obtained in step (2) was allowed to pass at a speed of 3 m/min through a production line box containing 15% potassium acetate solution at 75° C., which allowed polyethyleneimine to react with cyanuric chloride sufficiently, so as to realize the densification and completeness of the structure of the skin layer of the acid-resistant nanofiltration membrane. The performance evaluation showed that the acid-resistant nanofiltration membrane treated by this process had a removal rate of 97% for 2,000 ppm $MgSO_4$ with a flux of 5 gfd.

(4) Flux Improvement

The membrane obtained in step (3) was allowed to further pass at a speed of 3 m/min through 10% acetic acid solution at 30° C. The membrane was activated, so that the groups inside the membrane that did not participate in the densification reaction of the skin layer were protonized or activated. The activated acid-resistant nanofiltration membrane had a removal rate of 97% for 2,000 ppm $MgSO_4$ with a flux of 16 gfd.

Example 2

(1) Preparation of Base Membrane 200 kg of polyether sulfone (number-average molecular weight: 35,000 Da) and 20 kg of polyethylene glycol (number-average molecular weight: 6,000 Da) were added to 1000 L N,N-dimethylacetamide solvent, and stirred at a constant temperature of 25° C. for 12 h to dissolve them completely. Thereafter, the mixture was filtered, and left to defoam at 25° C. for 12 h, thereby giving a homogeneous and stable membrane casting solution for subsequent use.

The resulting membrane casting solution was uniformly coated on a non-woven substrate by a flat-plate film coating machine, and then put in a water circulating cooling tank where it passed successively through a room-temperature water tank and a 75° C. water tank to ensure complete exchange of solvent in the membrane. During the membrane coating, the ambient temperature was 25° C., and the ambient humidity was 40%; the residence time in air for evaporation was 5 s; the membrane coating rate was 8 m/min; the thickness of the membrane including the non-woven substrate was 6.5 mil. The performance evaluation showed that the molecular weight cutoff of the resulting base membrane was 20,000 Da.

(2) Generation of Nascent Membrane

The supporting base membrane made of polyether sulfone prepared in step (1) was coated by a coating device with a first liquid-phase solution, which was an aqueous solution comprising 4% N-phenyl-p-phenylenediamine and 0.2% dodecyl sodium sulfonate. The coating device allowed the N-phenyl-p-phenylenediamine solution to move at a speed of 3 m/min relative to the supporting base membrane made of polyether sulfone, so that the N-phenyl-p-phenylenediamine solution was in sufficient contact with the supporting base membrane. A second liquid-phase solution was coated onto the supporting base membrane that had been coated with the N-phenyl-p-phenylenediamine-containing solution. The second liquid-phase solution was an ethylcyclohexane solution containing 0.3% metribuzin. The coating device allowed the metribuzin to move at a speed of 2 m/min relative to the supporting base membrane that had been coated with the N-phenyl-p-phenylenediamine-containing solution, so as to realize sufficient contact. After reacting at 30° C. for 4 min, N-phenyl-p-phenylenediamine and metribuzin could contact and react with each other, thereby producing a nascent acid-resistant nanofiltration membrane. The performance evaluation showed that this nascent membrane had a removal rate of 51% for 2,000 ppm $MgSO_4$ with a flux of 4.6 gfd.

(3) Densification of the Skin Layer

The nascent membrane obtained in step (2) was allowed to pass at a speed of 3 m/min through a production line box containing 15% sodium bicarbonate solution at 70° C., which allowed N-phenyl-p-phenylenediamine to react with metribuzin sufficiently, so as to realize the densification and completeness of the structure of the skin layer of the acid-resistant nanofiltration membrane. The performance evaluation showed that the acid-resistant nanofiltration membrane treated by this process had a removal rate of 96% for 2,000 ppm $MgSO_4$ with a flux of 5 gfd.

(4) Flux Improvement

The membrane obtained in step (3) was allowed to further pass at a speed of 3 m/min through 15% lactic acid solution at 35° C. The membrane was activated, so that the groups inside the membrane that did not participate in the densification reaction of the skin layer were protonized or activated. The activated acid-resistant nanofiltration membrane had a removal rate of 96% for 2,000 ppm $MgSO_4$ with a flux of 14 gfd.

Example 3

(1) Preparation of Base Membrane 200 kg of polysulfone (number-average molecular weight: 70,000 Da) and 20 kg of polyethylene glycol (number-average molecular weight: 6,000 Da) were added to 1000 L N,N-dimethylformamide solvent, and stirred at a constant temperature of 25° C. for 12 h to dissolve them completely. Thereafter, the mixture was filtered, and left to defoam at 25° C. for 12 h, thereby giving a homogeneous and stable membrane casting solution for subsequent use.

The resulting membrane casting solution was uniformly coated on a non-woven substrate by a flat-plate film coating machine, and then put in a water circulating cooling tank where it passed successively through a room-temperature water tank and a 75° C. water tank to ensure complete exchange of solvent in the membrane. During the membrane coating, the ambient temperature was 25° C., and the ambient humidity was 40%; the residence time in air for evaporation was 5 s; the membrane coating rate was 8 m/min; the thickness of the membrane including the non-woven substrate was 6.5 mil. The performance evaluation showed that the molecular weight cutoff of the resulting base membrane was 20,000 Da.

(2) Generation of Nascent Membrane

The supporting base membrane made of polysulfone prepared in step (1) was coated by a coating device with a first liquid-phase solution, which was an aqueous solution comprising 4% polyvinylaniline (number-average molecular weight: 726 Da) and 0.2% dioctyl sodium sulfosuccinate. The coating device allowed the polyvinylaniline solution to move at a speed of 3 m/min relative to the supporting base membrane made of polysulfone, so that the polyvinylaniline solution was in sufficient contact with the supporting base membrane. A second liquid-phase solution was coated onto the supporting base membrane that had been coated with the polyvinylaniline-containing solution. The second liquid-phase solution was an n-pentane solution containing 0.3% 2-chloro-4-ethylamino-6-isopropylamino-1,3,5-triazine. The coating device allowed 2-chloro-4-ethylamino-6-isopropylamino-1,3,5-triazine to move at a speed of 2 m/min relative to the supporting base membrane that had been coated with the polyvinylaniline-containing solution, so as to realize sufficient contact. After reacting at 30° C. for 4 min, polyvinylaniline and 2-chloro-4-ethylamino-6-isopropylamino-1,3,5-triazine could contact and react with each other, thereby producing a nascent acid-resistant nanofiltration membrane. The performance evaluation showed that the nascent membrane had a removal rate of 51% for 2,000 ppm $MgSO_4$ with a flux of 4.6 gfd.

(3) Densification of the Skin Layer

The nascent membrane obtained in step (2) was allowed to pass at a speed of 3 m/min through a production line box containing 15% sodium bisulfite solution at 70° C., which allowed polyvinylaniline to react with 2-chloro-4-ethylamino-6-isopropylamino-1,3,5-triazine sufficiently, so as to realize the densification and completeness of the structure of the skin layer of the acid-resistant nanofiltration membrane. The performance evaluation showed that the acid-resistant nanofiltration membrane treated by this process had a removal rate of 96% for 2,000 ppm $MgSO_4$ with a flux of 4.5 gfd.

(4) Flux Improvement

The membrane obtained in step (3) was allowed to further pass at a speed of 3 m/min through 15% citric acid solution at 35° C. The membrane was activated, so that the groups inside the membrane that did not participate in the densification reaction of the skin layer were protonized or activated. The activated acid-resistant nanofiltration membrane had a removal rate of 96% for 2,000 ppm $MgSO_4$ with a flux of 13 gfd.

Example 4

(1) Preparation of Base Membrane 200 kg of polyvinylidene fluoride (number-average molecular weight: 40,000 Da) and 20 kg of polybutylene glycol (number-average molecular weight: 2,000 Da) were added to 1000 L dimethyl sulfoxide solvent, and stirred at a constant temperature of 25° C. for 12 h to dissolve them completely. Thereafter, the mixture was filtered, and left to defoam at 25° C. for 12 h, thereby giving a homogeneous and stable membrane casting solution for subsequent use.

The resulting membrane casting solution was uniformly coated on a non-woven substrate by a flat-plate film coating machine, and then put in a water circulating cooling tank where it passed successively through a room-temperature water tank and a 75° C. water tank to ensure complete exchange of solvent in the membrane. During the membrane coating, the ambient temperature was 25° C., and the ambient humidity was 40%; the residence time in air for evaporation was 5 s; the membrane coating rate was 8 m/min; the thickness of the membrane including the non-woven substrate was 6.5 mil. The performance evaluation showed that the molecular weight cutoff of the resulting base membrane was 20,000 Da.

(2) Generation of Nascent Membrane

The supporting base membrane made of polyvinylidene fluoride prepared in step (1) was coated by a coating device with a first liquid-phase solution, which was an aqueous solution comprising 4% polyvinylaniline (number-average molecular weight: 726 Da) and 0.2% sulfated castor oil. The coating device allowed the hexanediamine solution to move at a speed of 3 m/min relative to the supporting base membrane made of polyvinylidene fluoride, so that the hexanediamine solution was in sufficient contact with the supporting base membrane. A second liquid-phase solution was coated onto the supporting base membrane that had been coated with the hexanediamine-containing solution. The second liquid-phase solution was an n-heptane solution containing 0.3% 2,4-dichloro-1,3,5-s-triazine. The coating device allowed 2,4-dichloro-1,3,5-s-triazine to move at a speed of 2 m/min relative to the supporting base membrane that had been coated with the hexanediamine-containing solution, so as to realize sufficient contact. After reacting at 30° C. for 4 min, hexanediamine and 2,4-dichloro-1,3,5-s-triazine could contact and react with each other, thereby producing a nascent acid-resistant nanofiltration membrane. The performance evaluation showed that this nascent membrane had a removal rate of 51% for 2,000 ppm $MgSO_4$ with a flux of 5 gfd.

(3) Densification of the Skin Layer

The nascent membrane obtained in step (2) was allowed to pass at a speed of 3 m/min through a production line box containing 15% sodium phosphate solution at 70° C., which allowed hexanediamine to react with 2,4-dichloro-1,3,5-s-triazine sufficiently, so as to realize the densification and completeness of the structure of the skin layer of the acid-resistant nanofiltration membrane. The performance evaluation showed that the acid-resistant nanofiltration membrane treated by this process had a removal rate of 96% for 2,000 ppm $MgSO_4$ with a flux of 5 gfd.

(4) Flux Improvement

The membrane obtained in step (3) was allowed to further pass at a speed of 3 m/min through 15% malic acid solution at 35° C. The membrane was activated, so that the groups inside the membrane that did not participate in the densification reaction of the skin layer were protonized or activated. The activated acid-resistant nanofiltration membrane had a removal rate of 96% for 2,000 ppm $MgSO_4$ with a flux of 12 gfd.

Example 5

(1) Preparation of Base Membrane 200 kg of polyether-ether-ketone (number-average molecular weight: 50,000 Da) and 20 kg of isopropanol were added to 1000 L imidazolinone solvent, and stirred at a constant temperature of 25° C. for 12 h to dissolve them completely. Thereafter, the mixture was filtered, and left to defoam at 25° C. for 12 h, thereby giving a homogeneous and stable membrane casting solution for subsequent use.

The resulting membrane casting solution was uniformly coated on a non-woven substrate by a flat-plate film coating machine, and then put in a water circulating cooling tank where it passed successively through a room-temperature water tank and a 75° C. water tank to ensure complete exchange of solvent in the membrane. During the membrane coating, the ambient temperature was 25° C., and the ambient humidity was 40%; the residence time in air for evaporation was 5 s; the membrane coating rate was 8 m/min; the thickness of the membrane including the non-woven substrate was 6.5 mil. The performance evaluation showed that the molecular weight cutoff of the resulting base membrane was 20,000 Da.

(2) Generation of Nascent Membrane

The supporting base membrane made of polyether-ether-ketone prepared in step (1) was coated by a coating device with a first liquid-phase solution, which was an aqueous solution comprising 4% polybenzylamine (number-average molecular weight: 1,177 Da) and 0.2% polyoxyethylene-polyoxypropylene copolymer. The coating device allowed the polybenzylamine solution to move at a speed of 3 m/min relative to the supporting base membrane made of polyether-ether-ketone, so that the polybenzylamine solution was in sufficient contact with the supporting base membrane. A second liquid-phase solution was coated onto the supporting base membrane that had been coated with the polybenzylamine-containing solution. The second liquid-phase solution was an n-heptane solution containing 0.4% 2,4-dichloro-1,3,5-s-triazine. The coating device allowed 2,4-dichloro-1,3,5-s-triazine to move at a speed of 2 m/min relative to the supporting base membrane that had been coated with the polybenzylamine-containing solution, so as to realize sufficient contact. After reacting at 30° C. for 4 min, polybenzylamine and 2,4-dichloro-1,3,5-s-triazine could contact and react with each other, thereby producing a nascent acid-resistant nanofiltration membrane. The performance evaluation showed that this nascent membrane had a removal rate of 50% for 2,000 ppm $MgSO_4$ with a flux of 3 gfd.

(3) Densification of the Skin Layer

The nascent membrane obtained in step (2) was allowed to pass at a speed of 3 m/min through a production line box containing 15% sodium acetate solution at 70° C., which allowed polybenzylamine to react with 2,4-dichloro-1,3,5-s-triazine sufficiently, so as to realize the densification and completeness of the structure of the skin layer of the acid-resistant nanofiltration membrane. The performance evaluation showed that the acid-resistant nanofiltration membrane treated by this process had a removal rate of 96% for 2,000 ppm $MgSO_4$ with a flux of 3 gfd.

(4) Flux Improvement

The membrane obtained in step (3) was allowed to further pass at a speed of 3 m/min through 15% citric acid solution at 35° C. The membrane was activated, so that the groups inside the membrane that did not participate in the densification reaction of the skin layer were protonized or activated. The activated acid-resistant nanofiltration membrane had a removal rate of 96% for 2,000 ppm $MgSO_4$ with a flux of 15 gfd.

Example 6

(1) Preparation of Base Membrane 200 kg of polyether sulfone (number-average molecular weight: 35,000 Da) and 20 kg of polypropylene glycol (number-average molecular weight: 6,000 Da) were added to 1000 L dimethyl sulfoxide solvent, and stirred at a constant temperature of 25° C. for 12 h to dissolve them completely. Thereafter, the mixture was filtered, and left to defoam at 25° C. for 12 h, thereby giving a homogeneous and stable membrane casting solution for subsequent use.

The resulting membrane casting solution was uniformly coated on a non-woven substrate by a flat-plate film coating machine, and then put in a water circulating cooling tank where it passed successively through a room-temperature water tank and a 75° C. water tank to ensure complete exchange of solvent in the membrane. During the membrane coating, the ambient temperature was 25° C., and the ambient humidity was 40%; the residence time in air for evaporation was 5 s; the membrane coating rate was 8 m/min; the thickness of the membrane including the non-woven substrate was 6.5 mil. The performance evaluation showed that the molecular weight cutoff of the resulting base membrane was 20,000 Da.

(2) Generation of Nascent Membrane

The supporting base membrane made of polyether sulfone prepared in step (1) was coated by a coating device with a first liquid-phase solution, which was an aqueous solution comprising 4% polyvinylaniline (number-average molecular weight: 726 Da) and 0.2% dodecyl sodium sulfonate. The coating device allowed the hexanediamine solution to move at a speed of 3 m/min relative to the supporting base membrane made of polyether sulfone, so that the hexanediamine solution was in sufficient contact with the supporting base membrane. A second liquid-phase solution was coated onto the supporting base membrane that had been coated with the hexanediamine-containing solution. The second liquid-phase solution was an ethylcyclohexane solution containing 0.3% sodium salt of 4,4'-bis(2-chloro-4-diethanolamine-1,3,5-triazine)-6'-amino-2,2'-disulfobiphenyl. The coating device allowed the sodium salt of 4,4'-bis(2-chloro-4-diethanolamine-1,3,5-triazine)-6'-amino-2,2'-disulfobiphenyl to move at a speed of 2 m/min relative to the supporting base membrane that had been coated with the hexanediamine-containing solution, so as to realize sufficient contact. After reacting at 30° C. for 4 min, hexanediamine and the sodium salt of 4,4'-bis(2-chloro-4-diethanolamine-1,3,5-triazine)-6'-amino-2,2'-disulfobiphenyl could contact and react with each other, thereby producing a nascent acid-resistant nanofiltration membrane. The performance evaluation showed that this nascent membrane had a removal rate of 50% for 2,000 ppm $MgSO_4$ with a flux of 4 gfd.

(3) Densification of the Skin Layer

The nascent membrane obtained in step (2) was allowed to pass at a speed of 3 m/min through a production line box containing 15% sodium bicarbonate solution at 70° C., which allowed hexanediamine to react with the sodium salt of 4,4'-bis(2-chloro-4-diethanolamine-1,3,5-triazine)-6'-amino-2,2'-disulfobiphenyl sufficiently, so as to realize the densification and completeness of the structure of the skin layer of the acid-resistant nanofiltration membrane. The performance evaluation showed that the acid-resistant nanofiltration membrane treated by this process had a removal rate of 97% for 2,000 ppm $MgSO_4$ with a flux of 4 gfd.

(4) Flux Improvement

The membrane obtained in step (3) was allowed to further pass at a speed of 3 m/min through 15% citric acid solution at 35° C. The membrane was activated, so that the groups inside the membrane that did not participate in the densification reaction of the skin layer were protonized or activated. The activated acid-resistant nanofiltration membrane had a removal rate of 97% for 2,000 ppm $MgSO_4$ with a flux of 15 gfd.

Figure 2:
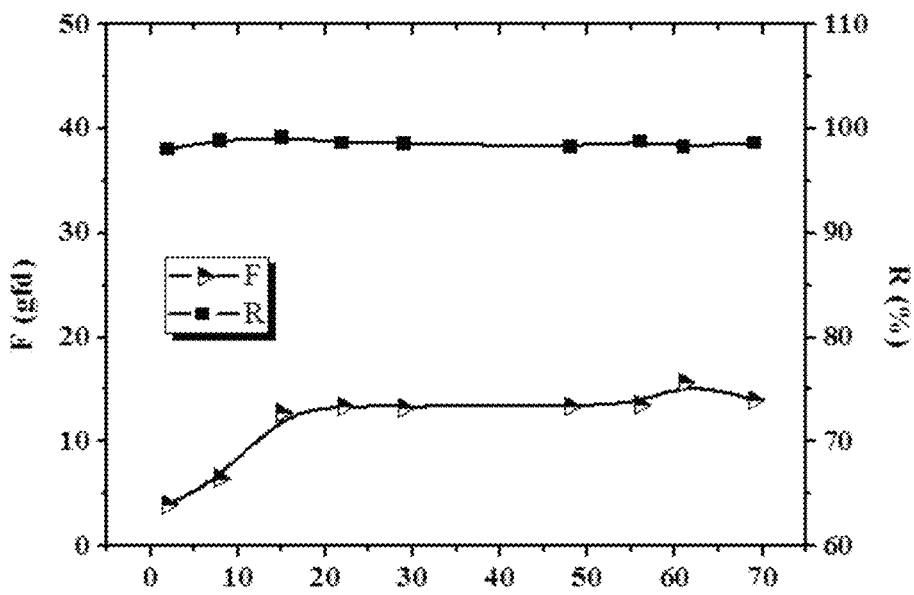
FIG. 2 shows the test results of the removal rate of 2000 ppm $MgSO_4$ and the membrane flux after immersing the acid-resistant nanofiltration membrane obtained according to Example 2 in 20% $HNO_3$ solution for different periods of time.
Figure 3:
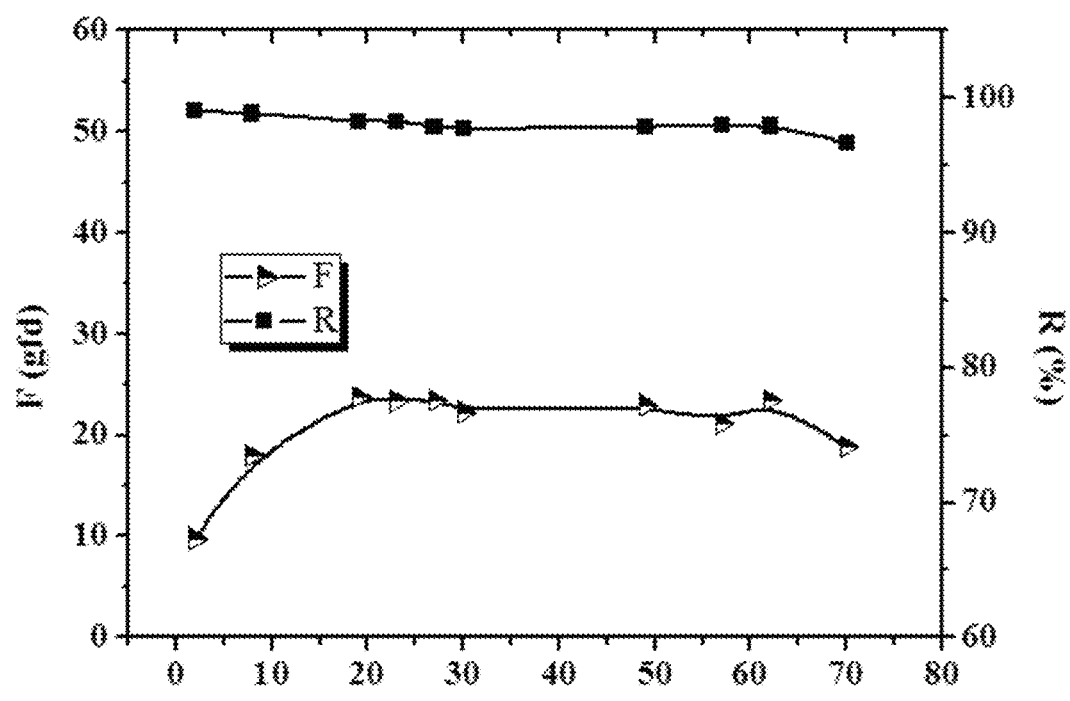
FIG. 3 shows the test results of the removal rate of 2000 ppm $MgSO_4$ and the membrane flux after immersing the acid-resistant nanofiltration membrane obtained according to Example 4 in 10% HF solution for different periods of time.

FIG. 1 showed the test results of the removal rate of 2000 ppm $MgSO_4$ and the membrane flux after immersing the acid-resistant nanofiltration membrane obtained according to Example 1 in 20% $H_2SO_4$ solution for different periods of time; FIG. 2 showed the test results of the removal rate of 2000 ppm $MgSO_4$ and the membrane flux after immersing the acid-resistant nanofiltration membrane obtained according to Example 2 in 20% $HNO_3$ solution for different periods of time; and FIG. 3 showed the test results of the removal rate of 2000 ppm $MgSO_4$ and the membrane flux after immersing the acid-resistant nanofiltration membrane obtained according to Example 4 in 10% HF solution for different periods of time. As could be appreciated from FIGS. 1 to 3, after long-term immersion in 20% $H_2SO_4$ solution, 20% $HNO_3$ solution, or 10% HF solution, the acid-resistant nanofiltration membranes obtained by the method of the present disclosure still maintained a desalting rate of 90% or more, or even 96% or more, and a flux of 5 gfd or more, or even 25 gfd or more.

Figure 4:
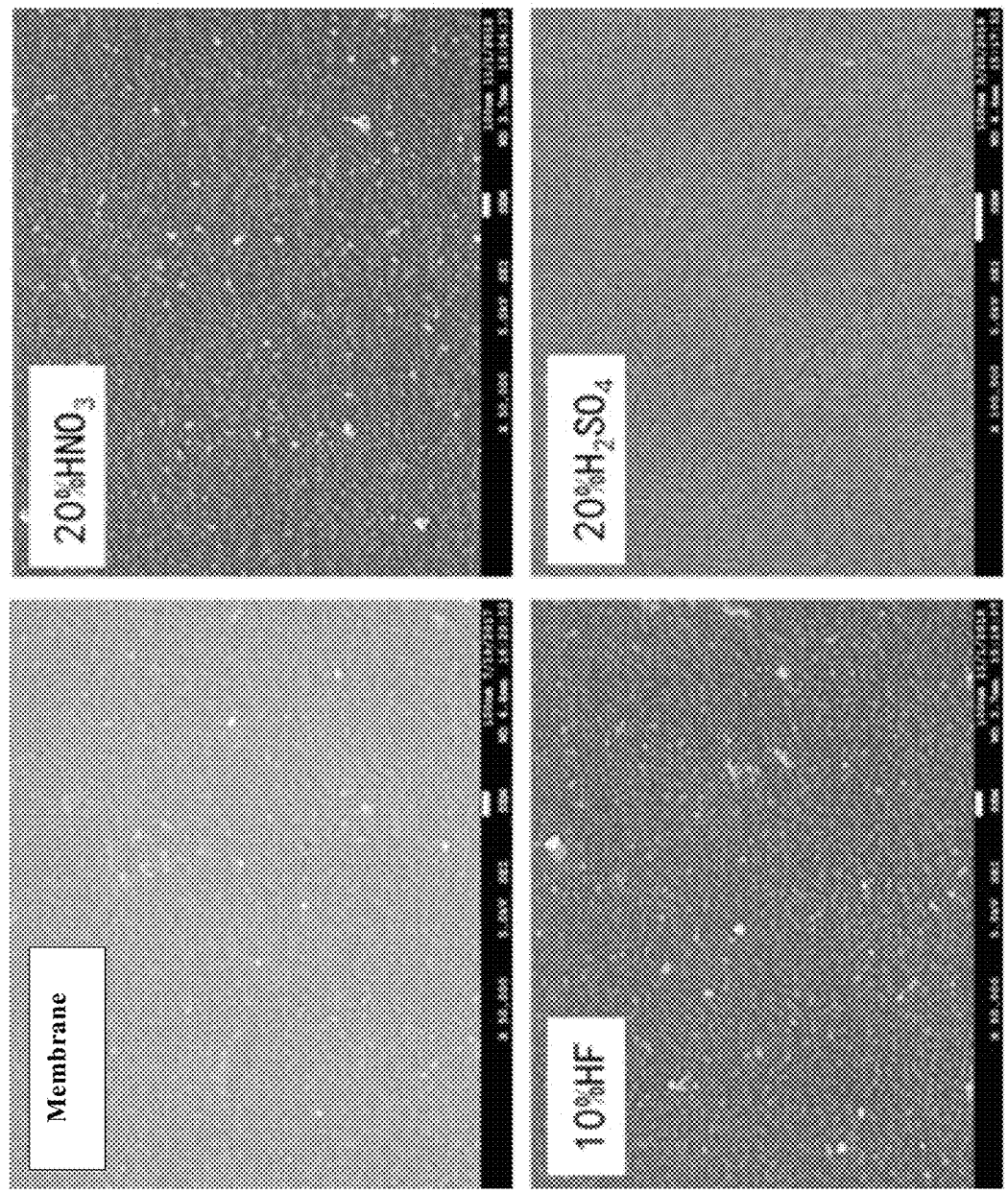
FIG. 4 illustrates the surface morphology of the acid-resistant nanofiltration membrane obtained according to Example 6 as observed by SEM before and after immersion in 20% $H_2SO_4$ solution, 20% $HNO_3$ solution, and 10% HF solution.

FIG. 4 illustrated the surface morphology of the acid-resistant nanofiltration membrane obtained according to Example 6 before immersion and after immersion in 20% $H_2SO_4$ solution, 20% $HNO_3$ solution, and 10% HF solution. It could be seen from FIG. 4 that after long-term immersion of the acid-resistant nanofiltration membrane obtained according to Example 6 in 20% $H_2SO_4$ solution, 20% $HNO_3$ solution, or 10% HF solution, the surface structure of the membrane was still densified without any defect.

INDUSTRIAL APPLICABILITY

The preparation method of nanofiltration membranes provided by the present disclosure enables continuous production of acid-resistant nanofiltration membranes with a high desalting rate and a high flux at low costs, and realizes safe, hygienic and environmentally friendly preparation of acid-resistant nanofiltration membranes. The nanofiltration membranes prepared by the preparation method of nanofiltration membranes provided by the present disclosure have excellent acid resistance, remove more than 96% of metal salts such as $FeSO_4$, $CuSO_4$, $MgSO_4$, $Al_2(SO_4)_3$, $NiSO_4 \cdot 6(H_2O)$, $CoSO_4 \cdot 7H_2O$ or the like from a mixture containing 2,000 ppm of the metal salts mentioned above, allow more than 90% of acids such as 20% HCl, $HNO_3$, $H_2SO_4$, $H_3PO_4$ or the like to permeate, and have a membrane flux of 10 to 20 gfd. In this way, it is possible to realize the removal of metal ions in the treatment of wastewater resulting from the smelting of mineral products such as copper, aluminum, gold, zinc, nickel, uranium, and rare earth, and it is possible to realize the purification of acidic solutions and the treatment of wastewater in chemical, electroplating, medicine, dairy, food and beverage, coating industries, etc by removing metal cations. They are useful for water treatment in industries faced with more complex and extreme feed environment.

The invention claimed is:

1. A method for preparing a nanofiltration membrane, comprising the steps of:
    dissolving a polymer in a solvent to prepare a polymer solution, and curing the polymer solution on a support material to form a base membrane;
    sequentially applying a first liquid-phase solution at a rate of 1 m/min to 6 m/min and a second liquid-phase solution at a rate of 1 m/min to 6 m/min on the base membrane to form a nascent membrane;
    densifying the nascent membrane by using an alkaline substance-containing solution;
    processing the densified nascent membrane by using an acidic substance-containing solution; and
    obtaining the nanofiltration membrane after post-processing and drying.

2. The method for preparing a nanofiltration membrane according to claim 1, wherein the polymer is at least one selected from the group consisting of polysulfone, polyethersulfone, polyvinylidene fluoride, polytetrafluoroethylene, polyether-ether-ketone, phthalazinone polyether nitrile ketone, and phthalazinone polyether ketone;
    wherein in the polymer solution, a content of the polymer is 0.05 kg/L to 0.35 kg/L relative to the content of the solvent; and
    wherein the polymer solution optionally contains a non-solvent.

3. The method for preparing a nanofiltration membrane according to claim 1, wherein the first liquid-phase solution contains a polyfunctional amine substance, and the polyfunctional amine substance is at least one selected from the group consisting of an aromatic diamine monomer having 6 to 12 carbon atoms, polyethyleneimine, polyvinylaniline, and polybenzylamine; and
    wherein the first liquid-phase solution optionally contains a surfactant.

4. The method for preparing a nanofiltration membrane according to claim 1, wherein the second liquid-phase solution contains a monomer or a polymer of a di-substituted, tri-substituted or tetra-substituted diazine or triazine, or a derivative of a triazine monomer;
    wherein a content of the monomer or the polymer of the di-substituted, tri-substituted or tetra-substituted diazine or triazine, or the derivative of the triazine monomer is 0.1 to 0.7 wt %, based on the weight of the second liquid-phase solution; and
    wherein a solvent in the second liquid-phase solution is at least one selected from the group consisting of a linear or branched alkane having 1 to 8 carbon atoms and a cycloalkane having 5 to 10 carbon atoms.

5. The method for preparing a nanofiltration membrane according to claim 1, wherein the alkaline substance is at least one selected from the group consisting of a weak alkaline chemical substance and a salt formed by a strong alkali and a weak acid.

6. The method for preparing a nanofiltration membrane according to claim 1, wherein a content of the alkaline substance is 3 to 25 wt % based on the weight of the alkaline substance-containing solution.

7. The method for preparing a nanofiltration membrane according to claim 1, wherein the acidic substance is at least one selected from the group consisting of a moderately acidic chemical substance, a weakly acidic chemical substance, or a salt formed by a strong acid and a weak base; and
    wherein a content of the acidic chemical substance is 5 to 25 wt % based on the weight of the acidic chemical substance-containing solution.

8. The method for preparing a nanofiltration membrane according to claim 1, wherein said densifying is carried out when the alkaline substance-containing solution is in a temperature range of from 30 to 80° C.

9. The method for preparing a nanofiltration membrane according to claim 1, wherein said processing of the densified nascent membrane is carried out when the acidic chemical substance-containing solution is in a temperature range of from 25 to 50° C.

10. A nanofiltration membrane obtained by the method for preparing a nanofiltration membrane according to claim 1.

11. The method for preparing a nanofiltration membrane according to claim 2, wherein, in the polymer solution, a content of the polymer is 0.1 kg/L to 0.3 kg/L relative to the content of the solvent;
    wherein the non-solvent is at least one selected from the group consisting of an alcohol having 1 to 6 carbon atoms, polyethylene glycol, polyvinylpyrrolidone, polypropylene glycol, and polybutylene glycol; and
    wherein the support material is a non-woven fabric.

12. The method for preparing a nanofiltration membrane according to claim 2, wherein, in the polymer solution, a content of the polymer is 0.15 kg/L to 0.25 kg/L relative to the content of the solvent.

13. The method for preparing a nanofiltration membrane according to claim 3, wherein, a content of the polyfunctional amine substance is 2 to 8 wt % based on the weight of the first liquid-phase solution;
    wherein a number-average molecular weight of the aromatic diamine monomer having 6 to 12 carbon atoms, the polyethyleneimine, the polyvinylaniline, or the polybenzylamine is in a range of 400 to 10,000 Da;
    wherein the surfactant is at least one selected from the group consisting of stearic acid, sodium lauryl sulfonate, alkyl glucoside $C_{16}H_{32}O_6$, sulfated castor oil, dioctyl sodium sulfosuccinate, and a polyoxyethylene-polyoxypropylene copolymer; and
    wherein a solvent in the first liquid-phase solution is water.

14. The method for preparing a nanofiltration membrane according to claim 3, wherein, in the polymer solution, a content of the polyfunctional amine substance is 3 to 7 wt % based on the weight of the first liquid-phase solution.

15. The method for preparing a nanofiltration membrane according to claim 4, wherein the second liquid-phase solution contains a monomer or an oligomer of a di-substituted, tri-substituted or tetra-substituted diazine or triazine, or a derivative of a triazine monomer; and
    wherein a content of the monomer or the polymer of the di-substituted, tri-substituted or tetra-substituted diazine or triazine, or the derivative of the triazine monomer is 0.2 to 0.6 wt % based on the weight of the second liquid-phase solution.

16. The method for preparing a nanofiltration membrane according to claim 4, wherein the second liquid-phase solution contains a di-substituted, tri-substituted or tetra-substituted s-triazine, or a monomer or an oligomer of 1,2,4-triazine, or a derivative of a triazine monomer.

17. The method for preparing a nanofiltration membrane according to claim 5, wherein the alkaline substance is at least one selected from the group consisting of carbonate, bicarbonate, bisulfite, acetate, phosphate and hypochlorite of sodium, potassium, calcium and barium.

18. The method for preparing a nanofiltration membrane according to claim 6, wherein a content of the alkaline substance is 3 to 20 wt % based on the weight of the alkaline substance-containing solution; and
wherein a solvent in the alkaline substance-containing solution is water.

19. The method for preparing a nanofiltration membrane according to claim 7, wherein the acidic substance is at least one selected from the group consisting of phosphoric acid, formic acid, acetic acid, propionic acid, lactic acid, malic acid, citric acid, copper sulfate, iron sulfate, ferric chloride, ammonium chloride, and aluminum chloride;
wherein a content of the acidic chemical substance is 5 to 20 wt % based on the weight of the acidic chemical substance-containing solution; and
wherein a solvent in the acidic substance-containing solution is water.

20. The method for preparing a nanofiltration membrane according to claim 7, wherein a content of the acidic chemical substance is 5 to 15 wt % based on the weight of the acidic chemical substance-containing solution.

21. The method of claim 1, wherein:
the first liquid-phase solution contains 4 to 6 wt % of a polyfunctional amine substance with a number-average molecular weight of 400 to 10,000 Da, and the second liquid-phase solution contains 0.3 to 0.5 wt % of metribuzin;
the nanofiltration membrane has a flux of 10 to 20 gfd at 100 psi;
the nanofiltration membrane is capable of removing metal salts from a solution at a rate of greater than 96%; and
the nanofiltration membrane is permeable to acids, such that more than 90% of an applied acid permeates the nanofiltration membrane.

* * * * *